(12) United States Patent
Bashev et al.

(10) Patent No.: US 11,520,597 B2
(45) Date of Patent: Dec. 6, 2022

(54) OPERATING SYSTEM ARCHITECTURE FOR MICROKERNEL GENERATIONS SUPPORT

(71) Applicant: LIMITED LIABILITY COMPANY "PEERF", Moscow (RU)

(72) Inventors: Vladimir Nikolaevich Bashev, Nizhny Novgorod (RU); Nikolay Olegovich Ilyin, Moscow (RU)

(73) Assignee: LIMITED LIABILITY COMPANY "PEERF", Moscow (RU)

( * ) Notice: Subject to any disclaimer, the term of this patent is extended or adjusted under 35 U.S.C. 154(b) by 226 days.

(21) Appl. No.: 16/904,594

(22) Filed: Jun. 18, 2020

(65) Prior Publication Data

US 2020/0401415 A1   Dec. 24, 2020

(30) Foreign Application Priority Data

Jun. 21, 2019   (RU) .......................... RU2019119349

(51) Int. Cl.
| | | |
|---|---|---|
| *G06F 9/4401* | (2018.01) | |
| *G06F 8/65* | (2018.01) | |
| *G06F 8/71* | (2018.01) | |
| *G06F 9/38* | (2018.01) | |
| *G06F 9/48* | (2006.01) | |
| *G06F 9/50* | (2006.01) | |

(52) U.S. Cl.
CPC .............. *G06F 9/4406* (2013.01); *G06F 8/65* (2013.01); *G06F 8/71* (2013.01); *G06F 9/3836* (2013.01); *G06F 9/4881* (2013.01); *G06F 9/5016* (2013.01)

(58) Field of Classification Search
CPC . G06F 9/4406; G06F 8/65; G06F 8/71; G06F 9/3836; G06F 9/4881; G06F 9/5016; G06F 9/44536; G06F 9/445; G06F 16/10
See application file for complete search history.

(56) References Cited

U.S. PATENT DOCUMENTS

| | | | | |
|---|---|---|---|---|
| 6,075,939 | A * | 6/2000 | Bunnell | G06F 9/44521 717/107 |
| 6,195,710 | B1 * | 2/2001 | Borgendale | G06F 9/5022 719/319 |
| 2011/0078668 | A1 * | 3/2011 | Larson | G06F 9/45537 717/136 |

* cited by examiner

*Primary Examiner* — Jaweed A Abbaszadeh
*Assistant Examiner* — Brian J Corcoran
(74) *Attorney, Agent, or Firm* — Nixon & Vanderhye P.C.

(57) ABSTRACT

Computer operating systems are provided that allow for applications compatibility with different OS generations. Example operating systems are designed using an adapted COM (ACOM) component architecture with immutable interfaces and their specifications within same generation, allowing freedom of components programming code implementation. That includes: modular microkernel itself comprising an interface bus component, possibility for OS concurrently run microkernels of various generations, create new components by reusing (comprising/delegating or aggregating) other binary components; special marshalling mechanism reduces header size by allowing executable file to have a single system interface instance' address pointer for dynamic functions importing without need to recompile applications earlier executables in accordance with the latest versions of OS system libraries.

5 Claims, 7 Drawing Sheets

OPERATING SYSTEM ARCHITECTURE FOR MICROKERNEL GENERATIONS SUPPORT

CROSS-REFERENCE TO RELATED APPLICATIONS

This application claims the priority benefit of Russian Patent Application RU 2019119349 filed on Jun. 21, 2019. The content of the abovementioned application is incorporated by reference herein.

TECHNICAL FIELD

This disclosure relates to computer engineering, in particular, to operating system (OS) architecture providing for simultaneous operation of microkernels of various generations.

BACKGROUND

The majority of modern operating systems are well structured modular systems capable of development, extension and transfer to new hardware platforms. One of OS structuring options is distinguishing between a monolithic and a microkernel architecture.

A kernel is the central part of an operating system providing to applications a coordinated access to computer resources, such as processor time, memory, external hardware, and input and output peripherals. A kernel typically provides file system and network protocol services. A microkernel (µ-kernel) is an operating system kernel with a minimal set of functions.

Microkernels are conditionally divided into generations. Microkernels of various generations differ in terms of structure and solution.

At present there is a number of solutions describing an OS architecture.

A prior art solution describing a computer operating system (US2006282899A1, MICROSOFT CORP, published on 14 Dec. 2006) is known. A disadvantage of this solution is that there is no option of changing the elements of the kernel itself, only adding functions at the kernel and application level.

A prior art solution (U.S. Pat. No. 6,075,939A, LYNX REAL TRIME SYSTEMS INC, published on 13 Jun. 2000) describing a computer operating system comprising a multitude of various components is known. In the known solution, component comprises function import and export tables. A disadvantage of this solution is that it does not provide for interchangeability of any architecture components.

A number of solutions describing various OS architectures are known. Such solutions, for example, are disclosed in the following documents: US20100251265A1, US20090158299A1, US20080148277A1, U.S. Pat. No. 6,308,247B1.

However, prior art OS architecture solutions have reduced functionality, in particular, none of them provides for simultaneous operation of microkernels of various generations.

SUMMARY

The technical problem the invention aims to solve is creation of an operating system architecture providing for simultaneous operation of microkernels of various generations, which is described in the independent claim.

The technical result is a creation of an operating system architecture providing for simultaneous operation of microkernels of various generations. It provides an option of running system components and applications developed for various microkernel generations (various operating system versions), and the option of a more extensive use of platform hardware resources by developing an OS kernel without compromising the existing application software functions.

An additional technical result obtained due to solving the technical task is providing for microkernel OS modularity; the modular principle permits to launch and stop components as required; for example, to correct an error, it is possible to change the component code, to compile a new component, to stop the old component and to launch a new one.

The preferred embodiment provides for an operating system (OS) architecture configured for simultaneous operation of microkernels of various generations, comprising:

a set of interconnected components of Adapted Component Object Model (ACOM) having a modular structure; the ACOM set comprises one or more components of each type chosen from the group below:

a management component configured to provide access and control of computer system resources;

a presentation component configured to control a user interface;

an application component configured to perform a logic of an applied task;

a microkernel component made as a container inside of which are enclosed:

a. a scheduler component configured to set and run tasks;

b. a component of an interface bus configured for tasks of components loading, registration and provisioning of interfaces;

wherein a header of each component includes an interface table comprising: a system interface pointer for access to interfaces of loaded components and their functions, and a component factory interface pointer configured for registration of components in the interface bus and access to component interfaces;

wherein the modular structure provides for simultaneous operation of a number of microkernels in the same OS instance; each new microkernel generation comprises a previous microkernel generation via containment or aggregation mechanisms, depending on hardware options.

BRIEF DESCRIPTION OF THE DRAWINGS

The embodiment of the invention will be described later in accordance with the attached drawings presented for explanation of the essence of the invention and in no way limiting the scope of the invention. The following drawings are attached to the application.

DETAILED DESCRIPTION OF THE INVENTION

Figure 1:
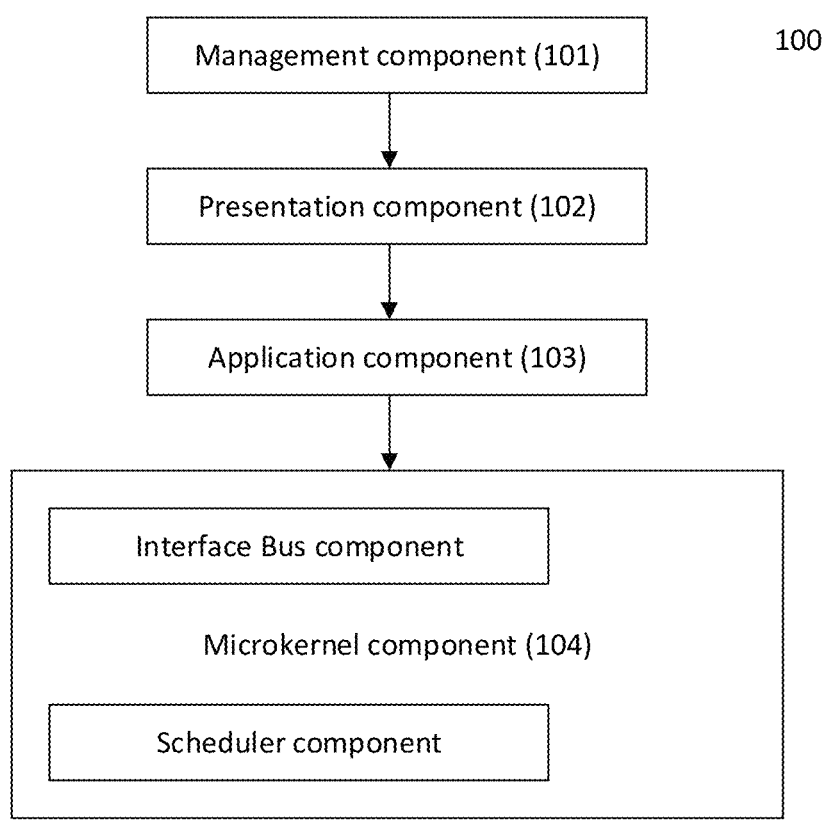
FIG. 1 shows an OS architecture.

In the following detailed description of the embodiment of the invention, multiple embodiment details providing for clear understanding of the present invention are provided. However, the way the present invention can be used will be evident for a domain expert with or without embodiment details. In other cases, well known methods, procedures and components were not described in details in order not to obscure specific features of the present invention.

Besides, it is apparent from the given explanation that the invention extends beyond the described embodiment. Multiple potential modifications, changes, variations and replacements maintaining the essence and form of the present invention will be evident for domain experts.

The present invention is aimed at creation of an OS architecture providing for simultaneous operation of microkernels of various generations.

A microkernel accounts for the implementation of the following functions:

1) Process scheduling—one of the microkernel components is a scheduler selecting one of the launched processes control to be transferred to; includes synchronization mechanisms;

2) Delegator interrupt handler—all hardware interruptions and exceptions are transferred to the respective process registered for handling one or another interruption without microkernel interference, except for the events which are serviced by the microkernel and which it is registered to (for example, timer interrupt handler used by the scheduler);

3) Interprocess communication—an interface bus is used to provide communication between the processes by requesting one or another interface and registration to the events of one or another interface.

In the claimed solution, the OS architecture is ACOM-based. The OS architecture comprises a number of interconnected ACOM components having a modular structure and supporting the operation of microkernels of various generations. A component is a constituent of a distributed application. The modular principle permits to run and stop components as required, for example, to correct an error, it is possible to change the component code, to compile a new component, to stop the old component and to launch a new one.

All basic OS elements, including its microkernel, consist of components with interaction interfaces. The microkernel itself is also a component with an interface. In the claimed ACOM technology there are component reuse mechanisms: aggregation and containment providing for reusing old microkernel versions in a new microkernel generation.

ACOM is based on evolved concept of Microsoft COM technology.

In the claimed solution, the operating system architecture providing for microkernel generations support is based on the use of the following:

1) the IUnknown interface with the QueryInterface, AddRef and Release methods. In the ACOM the interface is called IEcoUnknown, the GUID component identifier in the known COM technology is of 128 bits, while in the claimed solution it can be of 64 bits, 128 bits or 256 bits.

2) class factories, though the IClassFactory interface is called in the ACOM IEcoComponentFactory and is used as a component instance creation mechanism.

Figure 5:
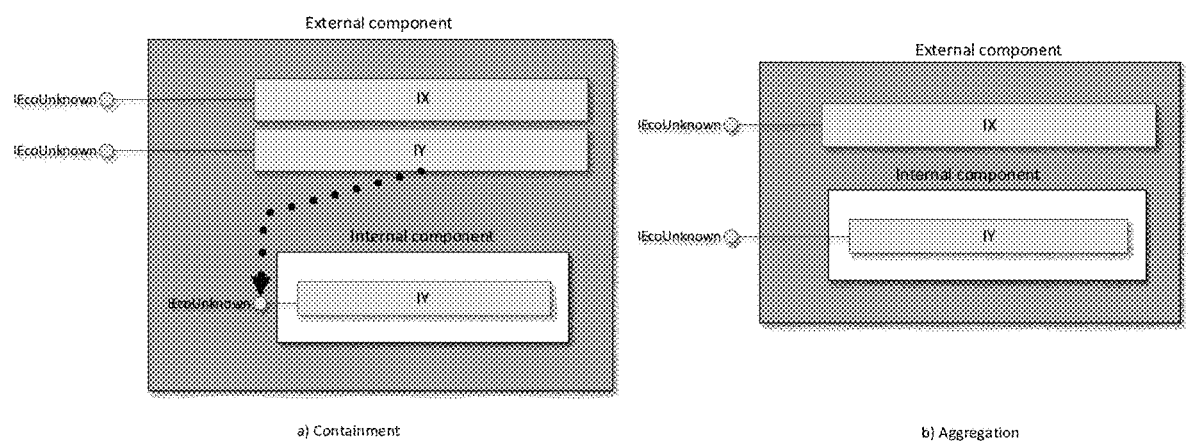
FIG. 5 shows a component reuse mechanism example.

3) component reuse mechanisms—containment and aggregation. Containment and aggregation are programming techniques, in which one (external) component uses another (internal) component, i.e. the external component aggregates or contains the internal one. The difference between the techniques consists in the fact that in case of containment, the external components implements internal component interfaces, thus, it can control the internal component before calling. In case of aggregation, the external component does not implement internal component interfaces, but directly transfers control to the internal component. The difference in the techniques is shown in the figure below (FIG. 5).

These techniques in combination with the interface use concept (virtual function tables) provide the option of supporting the operation of various generation microkernels.

4) marshalling mechanism.

As opposed to the known prior art OS architectures, the suggested one is distinguished by the following:

In the first instance, it supports microkernel component generations providing for simultaneous operation of microkernels of various generations. Each new microkernel generation (N+1, where N is the current generation) necessitates support of new hardware processor architectures being part of evolution and technological development of computer engineering. It can include changes in the architecture and calculation logic in the CPU or controller, as well as changes in the number of bits or program and I/O interfaces provided. To support such changes at the OS level, new microkernel generations are developed. Upon launching an application developed for a certain processor architecture (and hence, for a certain microkernel generation), the OS checks for the loaded component; if it is not available, it loads the required microkernel to the computer memory. In this case the loaded N-generation microkernel registers the pointer to itself in the N+1 microkernel, if launched, or in the following, newer N+M microkernel running within the OS. The fact of simultaneous operation of several microkernel generations within the same operating system instance provides for the use of any applications developed for various platform architectures (and hence, various OS microkernels) at the same time. It does not lose compatibility and operability for older applications upon release of new OS versions (generations), thus saving the investments of software developers, as well as end users solving the problem of application software incompatibility due to program interface and kernel changes in new versions of alternative OS and purchase of new software versions, respectively.

The second distinguishing feature is the fact the microkernel component itself has the form of a container and consists of such components as a scheduler component and an interface bus component providing for using various implementations of internal components depending on the required OS tasks and operating modes. For example, there is the option of switching to a real-time mode or other specific implementations of the scheduling mechanism or resource access distribution.

Figure 2:
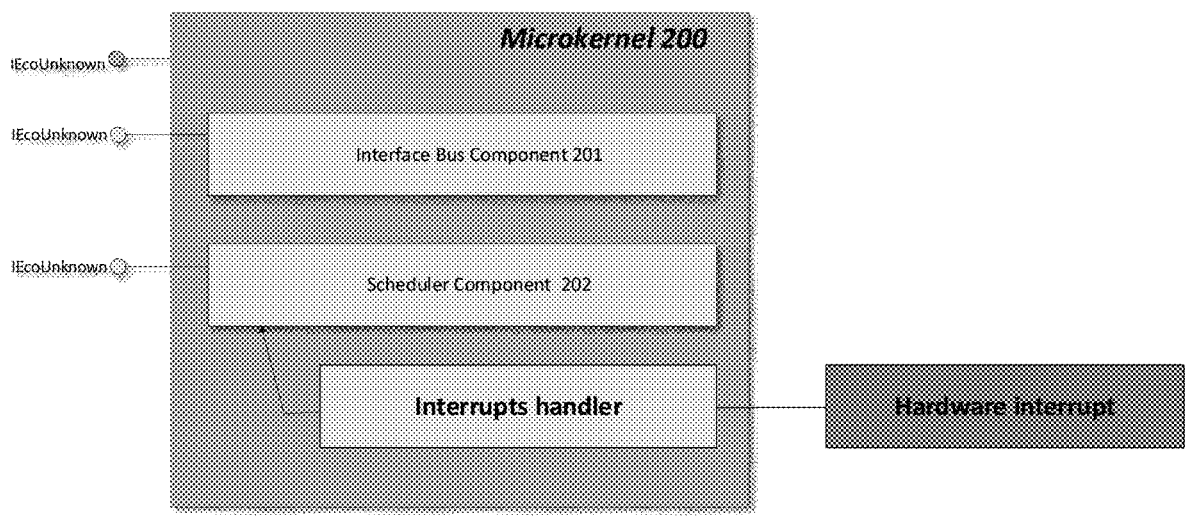
FIG. 2 shows a microkernel architecture.
Figure 3:
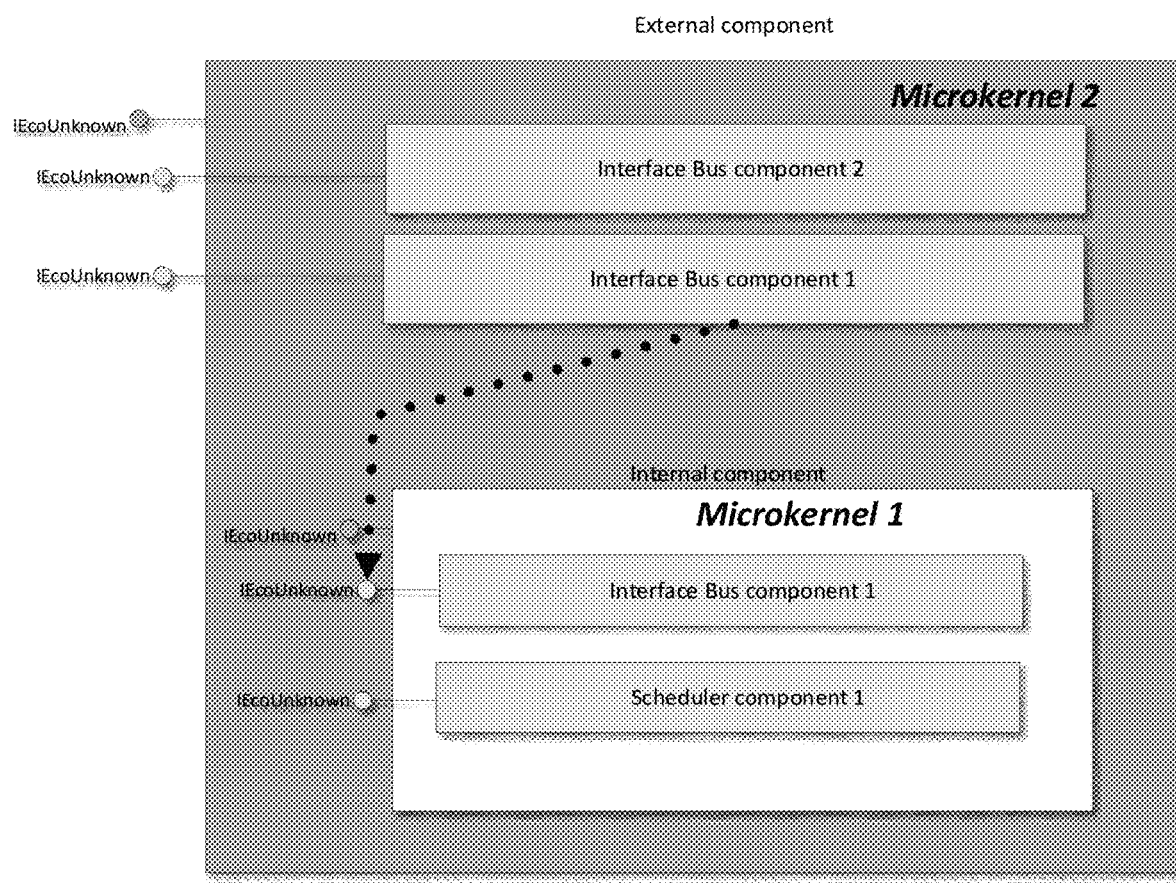
FIG. 3 shows a new generation microkernel comprising a previous generation microkernel.

In accordance with FIG. 1, the claimed OS architecture (100) is constructed in accordance with the client-server mode using the ACOM technology. All OS architecture elements including the microkernel (200 of FIG. 2) are components. Each component has specifications with interface description, which, in its turn, allows to implement one or another architecture element independently as per the specification. The architecture is component-based in accordance with the modular principle, allowing to include only the necessary components (modules) in the OS, depending on the set tasks. Due to component reuse mechanisms: ACOM aggregation and containment, a new generation microkernel may comprise previous generation microkernels (FIG. 3). Component reuse mechanisms is applicable to the entire component-based OS architecture constructed in accordance with the ACOM technology.

The ACOM set comprises one or more components of each type chosen from the group below:

a management component (101) configured to provide access and control of computer system resources;

a presentation component (102) configured to control a user interface;

an application component (103) configured to perform a logic of an applied task;

a microkernel component (104) made as a container inside of which are enclosed:
  a. a scheduler component (202) configured to set and run tasks;
  b. a component (201) of an interface bus configured for tasks of components loading, registration and provisioning of interfaces;

wherein a header of each component includes an interface table comprising: a system interface pointer for access to interfaces of loaded components and their functions, and a component factory interface pointer configured for registration of components in the interface bus and access to component interfaces. The modular structure provides for simultaneous operation of a number of microkernels in the same OS instance; each new microkernel generation comprises a previous microkernel generation via containment or aggregation mechanisms, depending on hardware options.

Figure 4:
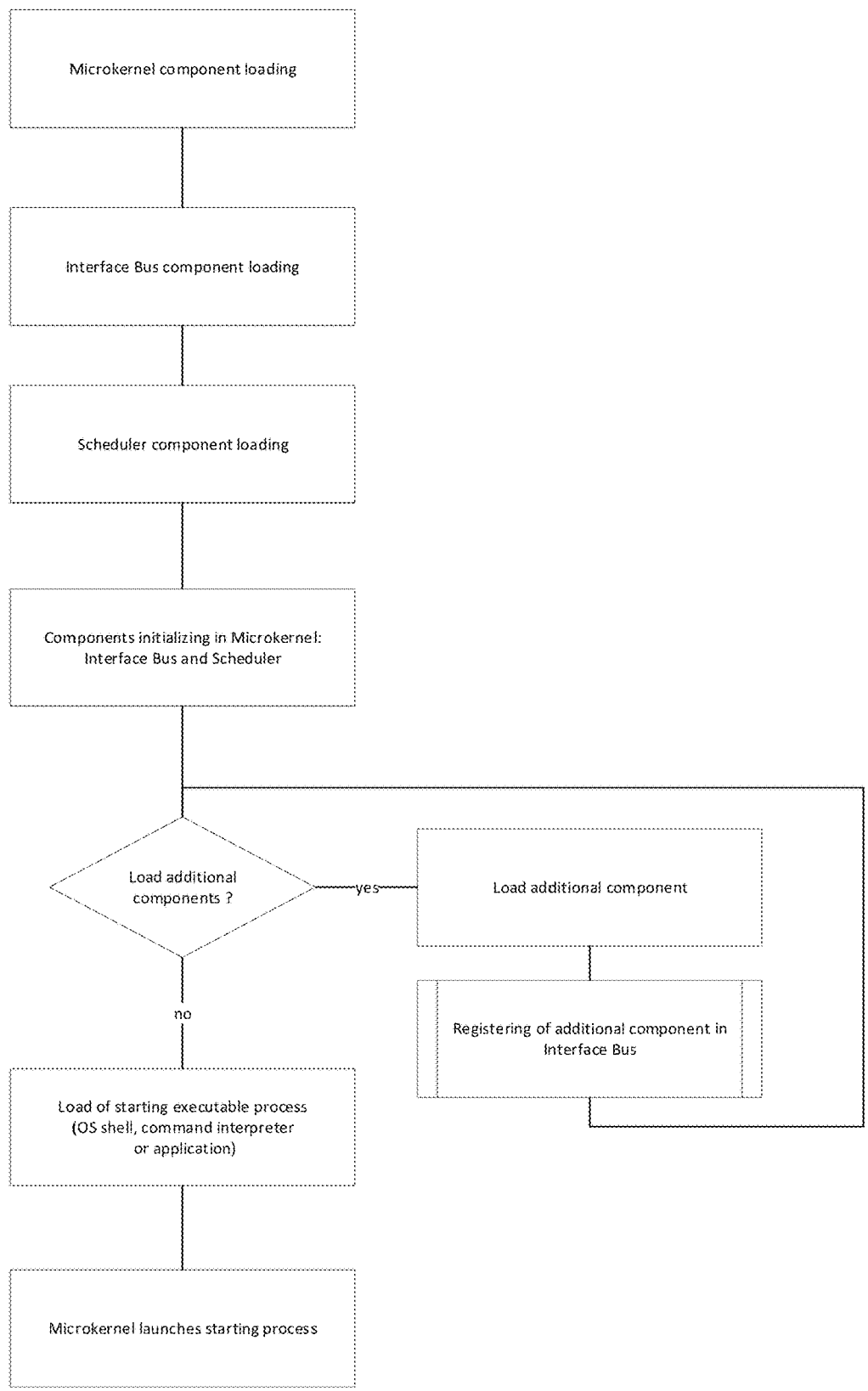
FIG. 4 shows a microkernel component loading process.

FIG. 4 shows microkernel components loading process.

A system loader is a system part directly dependent on the hardware.

In the minimum configuration, the loader loads the system microkernel and the "startup application".

As an option, the loader may load the following components:
  Memory manager;
  Device manager;
  File manager;
  Customized components.

After loading the microkernel to the memory, the loader registers the loaded components, such as memory managers, device manager, file manager and customized component in the interface bus depending on the linkage scenario. Then the loader loads the "Startup Application", the task context of which is stored in the scheduler and transfers control to it. At this stage, OS launching process is completed. Then the startup application can create and manage tasks.

Depending on the task type, the "Startup Application" can serve as an independent execution unit or as a shell for process generation.

The loading stages of the minimum OS configuration are given below:
  Upon switching on, the basic boot procedure is activated searching for and reading the boot sector, after which the procedure transfers control to a boot sector program.
  Depending on the file system type, the program located in the boot sector loads the main OS loader located on the file system to a free memory area and transfers control to the loader.
  An OS loader is a program implementing OS loading scenarios depending on the components for the initial run of the Startup Application. One of OS loading scenario implementations is the use of an interactive menu providing for the choice of components in the file system.
  As the first step, the OS Loader loads the microkernel component. The loader, depending on the scenario, can load the component to any free memory area and initialize it (prepare for operation) via interfaces described in the specification to the microkernel component, such as stack size, memory area, etc.
  As the second step, the OS Loader loads the scheduler component. The loader, depending on the scenario, can load the scheduler component to any free memory area.
  As the third step, the OS Loader loads the interface bus component. The loader, depending on the scenario, can load the interface bus component to any free memory area.
  After successful loading the microkernel components, such as the scheduler and the interface bus, the loader initializes the scheduler and interface bus components in the microkernel by calling the microkernel interface initialization method, sending the pointers to scheduler and interface bus components as parameters.

However, it should be emphasized that since the microkernel components, as well as scheduler and interface bus components have interfaces described as per the specification, any developer can make his/her own implementation in accordance with the specification, be it a microkernel, a scheduler or an interface bus component. For example: an independent developer has developed a scheduler, in which process switching time is decreased by several cycles of processor time, however, the component has interfaces described in the specification. Thus, loading of the scheduler component by an independent developer may be set in the OS loading scenario.

The next step in the OS loading scenario is loading and registration in the interface bus of optional components essential for launching the startup application. This step is not mandatory and depends on the components used by the startup application. One of the most demanded components—a memory management component is given as an example. The loader, depending on the scenario, can load the memory management component to any free memory area.

After successful loading the optional component, the OS Loader calls the registration method of interface bus component interface for component registration in the system.

However, it should be emphasized that in the majority of operating systems, memory management is an integral part of the operating system. A distinctive feature of the claimed OS architecture is that memory management is an optional task due to various memory allocation methods:—without involvement of external memory (fixed partitions, dynamic partitions, relocatable partitions) and with involvement of external memory (paging, segmentation or segmentation with paging). From this perspective, memory management component specification describes interface requirements, but does not regulate memory allocation methods. Due to this fact, memory management component developers can use the memory management methods, which is most effective in their opinion. In the claimed OS architecture, immutable interfaces (input and output parameters) and strict implementation according to the specification are of importance.

Interfaces of components located in the memory or file system are called via the interface bus component.

After loading the microkernel to the memory, the loader, depending on the linkage scenario, registers the loaded system components in the interface bus, such as memory management components, device manager, file manager, etc.

However, it should be emphasized that the interface bus component registry contains the data only on the components located in the memory. The registry for component registration has a limited volume. To extend the interface bus registry, it is necessary to load the memory manager, which is performed by the loader at microkernel loading and registration in the interface bus registry. Components located in the file system are loaded via the file manager. In case of using the components located in the file system, the loader has to load the file manager to the system memory and register it in the interface bus registry.

As to the scheduler component, it also has interfaces described as per the specification providing for making a set of schedulers (with various scheduling algorithms) having various characteristics depending on the tasks.

Figure 6:
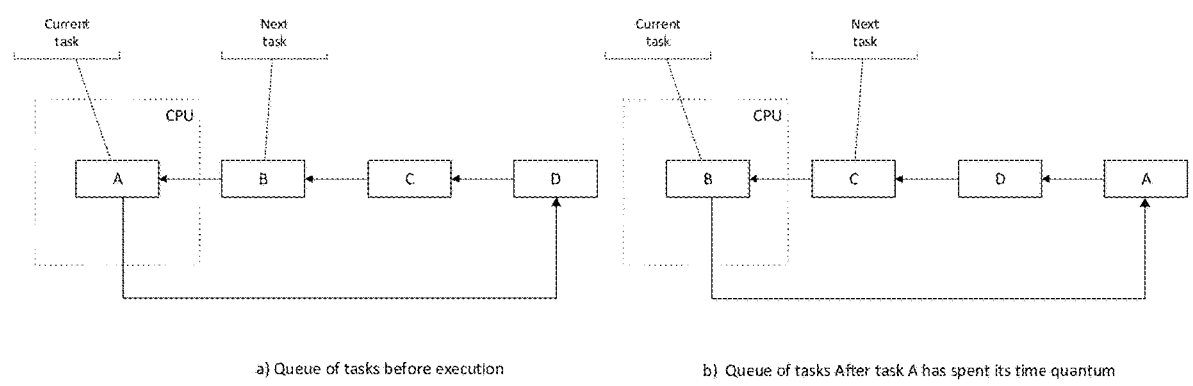
FIG. 6 shows a round-robin scheduling example.

For example, a scheduler can be implemented with the simplest task implementation scheduling using the time slotting algorithm. A processor time slot is assigned to each task. When the slot ends, the scheduler puts the task at the end of the queue (as FIG. 6 shows).

The OS executable file format is described below.

Figure 7:
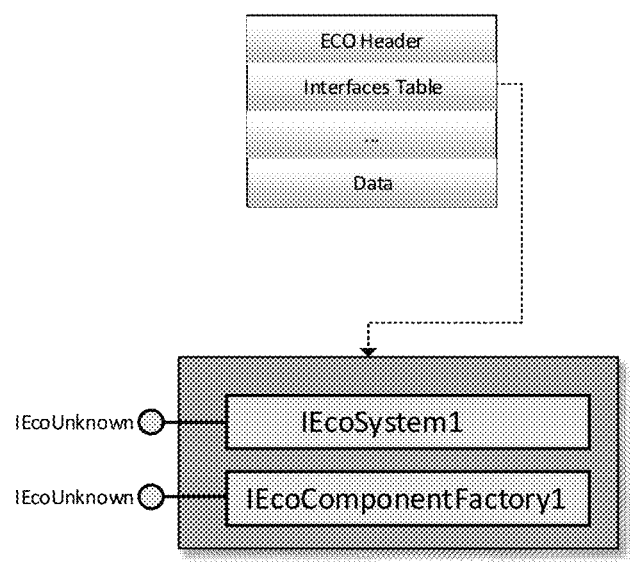
FIG. 7 shows the general executable file format.

The general executable file format is shown in FIG. 7. The header contains general information on the file and its basic characteristics. The interface table contains IEcoUnknown interface address pointers. The main pointer (link) is the pointer to the system interface (EcoSystem1); this interface provides access to the interfaces of imported components and their methods (functions). The second important pointer in the interface table is the pointer to the component factory interface (IEcoComponentFactory); via this interface the system registers components in the interface bus and creates data instances. The interface table is followed by specific operating system headers, code and data blocks (segments).

A distinguishing feature of the format is the absence of function import and export tables, which considerably reduces the executable file header volume. Due to constant development, improvement and addition of new capabilities, the microkernel OS shell, when loading a process, creates a system interface instance of the latest version at one or another stage of development.

Since the interface table contains IEcoUnknown interface address pointers, the OS shell, in particular, for the system interface, writes the pointer address, for example, IEcoSystem4 of the system interface of the 4-th version.

The executable process (the process, either in the old or in the latest version, developed for the first version of the kernel using the IEcoSystem1 system interface or developed for the latest version of the kernel using the IEcoSystem4 system interface), using the QueryInterface method of the IEcoUnknown interface calls the version of the system interface it can operate with. For the first case, the IEcoSystem4 system interface will create an IEcoSystem1 system interface instance and return the respective pointer, and for the second case IEcoUnknown will return the pointer to itself, since the IEcoUnknown interface address coincides with the IEcoSystem4 address.

Thus, operability of the programs developed at an early stage is supported in the latest OS versions at the binary level, i.e. no recompilation is required.

As a comparison, a simple "Hello World!" program written for the 2.x kernel RedHat OS version, using the printf function of the libc library is inoperable on the 3.x kernel RedHat OS version without recompilation, and the "libc2.x library not found" error will be displayed.

Another standout feature provided by the abovementioned interaction pattern is that an application (process) developed for the latest OS version can account for its minimum capabilities, and run (be executed) on early OS versions. In other words, if a process (using the QueryInterface method of the IEcoUnknown interface) calls the IEcoSystem4 system interface, and a null pointer is returned to it, it can call a pointer to an earlier system interface version, for example, IEcoSystem3, limiting its capabilities respectively. This approach is used by none of the prior art operating system, at the executable file level.

Thus, an advantage at the executable file level is achieved:

1) Only one system interface pointer address for imported functions;

2) No need to recompile earlier software versions in accordance with the latest versions of OS system libraries;

3) The possibility to execute the software developed for new OS versions in a reduced functionality mode on older OS versions.

The present application materials contain the preferred embodiment of the technical solution, which should not be used as limiting other, private embodiments, which do not go beyond the scope of the requested legal protection and are obvious to domain experts.

The invention claimed is:

1. A computer system comprising:
at least one hardware processor configured to execute computer readable instructions provided as part of an operating system (OS) configured for simultaneous operation of microkernels of different generations that are configured to operate with different types of hardware resources on which the OS is configured to operate, the operating system comprising:
a set of components that includes a microkernel, and at least one of:
1) a resource manager that includes computer executable instructions that, when executed by the at least one hardware processor, are configured to provide access and control of computer system resources, and
2) an application component that includes computer executable instructions that, when executed by the at least one hardware processor, are configured to perform a logic of an applied task;
wherein the microkernel comprises:
a) a task scheduler component that includes computer executable instructions that, when executed by the at least one hardware processor, are configured to set and run tasks within the OS; and
b) an interface bus component that includes computer executable instructions that, when executed by the at least one hardware processor, are configured to register other components and provision interfaces for the other components;
wherein a header of each component of the set of components includes an interface table comprising:
a) a system interface pointer that points to a memory location of a system interface instance for the component in a respective generation microkernel, the system interface configured to provide access to the interface bus, which in its turn provides access to interfaces of any components available in the OS, and
b) a component factory interface pointer that points to a memory location of a component factory that is configured to create and register instances of a respective component in the interface bus of the respective generation microkernel and access to the interfaces of that respective component that has been registered;
wherein the operating system comprises further executable instructions configured to, when executed by the at least one hardware processor, cause the at least one hardware processor to perform operations comprising:
based on loading of a given component, creating an instance of the system interface for the component in the respective generation microkernel and storing it in the interface bus of the respective generation microkernel;

based on a request for the given component from a calling process, initializing, by using the component factory interface pointer that is located in the header of the given component to access the component factory, an instance of the given component by using the interface bus; and returning, to the calling process, a pointer to the requested interface of the instance of the given component.

2. The computer system of claim 1, wherein at least one component reuses and exposes interfaces of at least one other inner binary component via containment or aggregation.

3. The computer system of claim 1, wherein the modular microkernel structure provides simultaneous operation of multiple different microkernels within the same OS instance.

4. The computer system of claim 1, wherein a microkernel component of a first generation comprises a microkernel component of different generation.

5. The computer system of claim 1, wherein a corresponding pointer for a created instance of the system interface is saved in the component memory.

* * * * *